(12) United States Patent
Okamoto et al.

(10) Patent No.: US 7,394,499 B2
(45) Date of Patent: Jul. 1, 2008

(54) DATA TRANSMITTING METHOD, DATA RECEIVING METHOD, DATA TRANSMITTING DEVICE, AND DATA RECEIVING DEVICE

(75) Inventors: Hiroshige Okamoto, Kanagawa (JP); Tetsuya Hiroe, Kanagawa (JP); Sho Murakoshi, Tokyo (JP); Naoki Ejima, Hirakata (JP); Toshiroh Nishio, Hirakata (JP); Akihisa Kawamura, Hirakata (JP); Hidekazu Suzuki, Yamatokoriyama (JP)

(73) Assignees: Matsushita Electric Industrial Co., Ltd., Osaka (JP); Sony Corporation, Tokyo (JP)

( * ) Notice: Subject to any disclaimer, the term of this patent is extended or adjusted under 35 U.S.C. 154(b) by 1234 days.

(21) Appl. No.: 10/472,585

(22) PCT Filed: Mar. 25, 2002

(86) PCT No.: PCT/JP02/02824

§ 371 (c)(1),
(2), (4) Date: Sep. 22, 2003

(87) PCT Pub. No.: WO02/078336

PCT Pub. Date: Oct. 3, 2002

(65) Prior Publication Data

US 2004/0095509 A1    May 20, 2004

(30) Foreign Application Priority Data

Mar. 23, 2001    (JP)    ............................ 2001-085714

(51) Int. Cl.
*H04N 7/087*    (2006.01)
(52) U.S. Cl. ........................ 348/478; 348/462; 348/482
(58) Field of Classification Search ................. 348/478, 348/473, 476, 512, 482–485, 515, 462, 738; 386/39, 96, 102, 104; *H04N 7/08, 7/087*
See application file for complete search history.

(56) References Cited

U.S. PATENT DOCUMENTS 5,202,761 A * 4/1993 Cooper ....................... 348/515
5,940,070 A    8/1999 Koo
6,914,637 B1 * 7/2005 Wolf et al. ................... 348/473

FOREIGN PATENT DOCUMENTS

JP        05-064171        3/1993

(Continued)

OTHER PUBLICATIONS

Digital Display Working Group, "Digital Visual Interface DVI", Revision 1.0, Apr. 2, 1999, pp. 1-76.

*Primary Examiner*—Sherrie Hsia
(74) *Attorney, Agent, or Firm*—Wenderoth, Lind & Ponack, L.L.P.

(57) ABSTRACT

This invention provides a data transmission method and a data receiving method which enable audio data to be multiplexed into video data and be transmitted using a DVI standard cable or the like satisfactorily with a simple configuration.

From a data transmitting end, a superimposed video/audio data signal in which audio data are superimposed over a video blanking interval of video data in superimposition timing that is generated using a video blank sync signal and a pixel clock, are transmitted to a data receiving end through the DVI cable, together with the video blank sync signal and the pixel clock. On the data receiving end, a timing signal for extracting the audio data from the superimposed video/audio data signal is generated using the transmitted video blank sync signal and pixel clock, and the superimposed video/audio data signal is separated into video data and audio data using the generated timing signal, as well as the digital audio data are converted into an analog audio signal using an audio clock that is generated by dividing the frequency of the pixel clock.

10 Claims, 7 Drawing Sheets

FOREIGN PATENT DOCUMENTS

| | | |
|---|---|---|
| JP | 7-38860 | 2/1995 |
| JP | 8-111067 | 4/1996 |
| JP | 08-111067 | 4/1996 |
| JP | 8-154084 | 6/1996 |
| JP | 9-179536 | 7/1997 |
| JP | 10-242953 | 9/1998 |
| JP | 2876878 | 1/1999 |
| JP | 11-317916 | 11/1999 |
| JP | 2000-165824 | 6/2000 |
| JP | 2002-576429 | 9/2005 |
| JP | 3718836 | 9/2005 |
| TW | 308663 | 6/1997 |

* cited by examiner

DATA TRANSMITTING METHOD, DATA RECEIVING METHOD, DATA TRANSMITTING DEVICE, AND DATA RECEIVING DEVICE

TECHNICAL FIELD

The present invention relates to a data transmission method and a data receiving method for a digital signal transmission system in which a video signal source and a video display device are connected, for example, through a DVI (Digital Video Interface) and, more particularly, to a data transmission method and a data receiving method, by which audio data can be transmitted easily and satisfactorily through an existing interface that transmits video data.

BACKGROUND ART

In recent years, a standard referred to as DVI standard has been established for transmitting video data to a video display device in a format of digital data when a video signal source such as a television tuner, a video player or a personal computer device body, and a video display device such as a monitor receiver are connected.

Details of the DVI standard will be given in following descriptions of embodiments while, to be brief, the DVI standard allows video data to be transmitted to the display device by digitizing primary color signals R, G and B in pixel units, respectively, thereby transmitting and displaying high-definition images. In addition, as the video data in pixel units are transmitted, a display driver can be directly driven by the received video data on the display device side, thereby realizing display or the like with a relatively simple processing configuration.

Data transmitted through a cable that is defined by the DVI standard are fundamentally only video data, and thus when considering that audio data are transmitted at the same time, the display device and an audio output device such as a tuner must be connected through an audio cable, which is different from the cable defined by the DVI standard.

However, when the display device and the signal sources are connected through plural cables, the connection configuration is adversely complicated.

More specifically, when considering a configuration of the system that transmits only video data, for example a video signal source 701 and a display device 703 are connected through a DVI standard cable 702 as shown in FIG. 7, and video data which are coded according to the DVI standard are transmitted through the cable 702, whereby the video data can be transmitted from the video signal source 701 to the display device 703. On the other hand, when video data and audio data are transmitted from a video/audio signal source 801 to a display device with speaker 804 as shown in FIG. 8, the signal source and the speaker display must be connected so that the video data are transmitted by a DVI standard cable 802 and the audio data are transmitted by an audio signal cable 803 that is different from the cable 802. When the video/audio signal source 801 and the display device 804 are connected as shown in FIG. 8, video that is outputted from the signal source 801 can be displayed on the display device 804, and sounds can be outputted from speakers 805L and 805R which are mounted on the display device 804.

However, when video data and audio data are transmitted using different cables as shown in FIG. 8, the connection configuration is complicated correspondingly. It is preferable that the devices are connected through as few cables as possible.

The technology for multiplexing video and audio data, and transmitting multiplexed data through one cable can be realized by adopting a data transmission technique that employs for example a bus line which is standardized as IEEE (The Institute of Electrical and Electronics Engineers) 1394 system. However, quite complicated data processing is required to transmit data through the bus line according to this IEEE 1394 system, and accordingly a quite large circuit construction is needed as a configuration for an encoding process to transmit data on the transmitting end, or a configuration for decoding data that are received through the bus line on a receiving end, resulting in a high cost. Further, in the IEEE 1394 system, the video data and audio data are compressively coded and multiplexed in view of a transmission rate and the like, and thus the image quality is inferior to that in the case where video data digitized in pixel units are transmitted according to the above-mentioned DVI standard.

In addition, when the digitized audio data are to be transmitted together, a video clock and an audio clock must be transmitted simultaneously, so that signal lines for the transmission are needed, and jitter is unfavorably increased because the high-speed signals are transmitted.

The present invention is made to solve the above-mentioned problems, and this invention has for its object to provide a data transmission method and a data receiving method by which audio data can be transmitted easily and satisfactorily using an existing interface through which video data are transmitted.

DISCLOSURE OF THE INVENTION

To overcome the above-mentioned problems, according to the present invention (claim 1), there is provided a data transmission method in a digital signal transmission system using a digital display connecting interface comprising the steps of: capturing digital audio data from a video/audio signal source; processing the captured digital audio data to generate transmission audio data; temporarily storing the generated transmission audio data; generating a timing signal using a video blank sync signal and a pixel clock for video data, which are obtained from the video/audio signal source, and superimposing the temporarily-stored transmission audio data at a predetermined position in a video blanking interval of video data that are outputted from the video/audio signal source, in accordance with the generated timing signal; and transmitting the video data on which the transmission audio data are superimposed, the video blank sync signal, and the pixel clock, to a data receiving end.

Therefore, video data and audio data can be transmitted simultaneously with adopting the existing video data transmission format such as DVI standard, thereby realizing a digital signal transmission system that can satisfactorily transmit digital audio data using a transmission line for transmitting video data, while utilizing the existing configuration for transmitting video data as it is.

According to the present invention (claim 2), in the data transmission method of claim 1, in the step of generating the transmission audio data, a frequency division parameter at a time when an audio clock that is used in reproduction of digital audio data is generated by dividing the frequency of the pixel clock for video data, is added to the transmission audio data.

Therefore, video data and audio data can be transmitted simultaneously with adopting the existing video data transmission format such as DVI standard, thereby realizing a digital signal transmission system that can satisfactorily transmit digital audio data using a transmission line for transmitting video data, while utilizing the existing configuration for transmitting video data as it is.

According to the present invention (claim 3), in the data transmission method of claim 2, the frequency division parameter has two values N and M that meet a following relationship: the pixel clock×N=the audio clock×M.

Therefore, video data and audio data can be transmitted simultaneously with adopting the existing video data transmission format such as DVI standard, thereby realizing a digital signal transmission system that can satisfactorily transmit digital audio data using a transmission line for transmitting video data, while utilizing the existing configuration for transmitting video data as it is.

According to the present invention (claim 4), in the data transmission method of any of claims 1 to 3, prior to the step of generating the transmission audio data, a step of converting a sampling frequency for the digital audio data that are captured from the video/audio signal source is carried out.

Therefore, video data and audio data can be transmitted simultaneously with adopting the existing video data transmission format such as DVI standard, thereby realizing a digital signal transmission system that can satisfactorily transmit digital audio data using a transmission line for transmitting video data, while utilizing the existing configuration for transmitting video data as it is.

According to the present invention (claim 5), there is provided a data receiving method for receiving data that are transmitted by the data transmission method of claim 1, including the step of: generating a timing signal using the video blank sync signal and the pixel clock which are transmitted from a transmitting end, and separating the video data on which audio data transmitted from the transmitting end are superimposed, into video data and audio data in accordance with the generated timing signal.

Therefore, it is possible to realize a digital signal transmission system that can satisfactorily transmit digital audio data using a transmitting line for transmitting video data, while utilizing the existing configuration for transmitting video data as it is.

According to the present invention (claim 6), the data receiving method of claim 5 further includes the step of: dividing the frequency of the pixel clock that is transmitted from the transmitting end, thereby generating an audio clock that is used in reproduction of digital audio data.

Therefore, it is possible to realize a digital signal transmission system that can satisfactorily transmit digital audio data using a transmitting line for transmitting video data, while utilizing the existing configuration for transmitting video data as it is.

According to the present invention (claim 7), there is provided a data transmitter that is employed in a digital signal transmission system using a digital display connecting interface, comprising: a data capture means for capturing digital audio data from a video/audio signal source; an audio data processing means for processing the digital audio data that are captured by the data capture means, to generate transmission audio data; a data storage means for temporarily storing the transmission audio data that are generated by the audio data processing means; a video/audio data superimposition means for generating a timing signal using a video blank sync signal and a pixel clock for video data, which are obtained from the video/audio signal source, and superimposing the transmission audio data that are stored in the data storage means at a predetermined position in a video blanking interval of video data that are outputted from the video/audio signal source, in accordance with the generated timing signal; and a data transmission means for transmitting the video data on which the transmission audio data are superimposed, the video blank sync signal, and the pixel clock, to a data receiving end.

Therefore, it is possible to provide a data transmitter that realizes a digital signal transmission system which can satisfactorily transmit digital audio data using a transmitting line for transmitting video data, while utilizing the existing configuration for transmitting video data as it is.

According to the present invention (claim 8), there is provided a data receiver that receives data which are transmitted by the data transmitter of claim 7, including: a video/audio data separation means for generating a timing signal using the video blank sync signal and the pixel clock which are transmitted from the data transmitter, and separating the video data on which the audio data that are transmitted from the data transmitter are superimposed, into video data and audio data, in accordance with the generated timing signal.

Therefore, it is possible to provide a data receiver that realizes a digital signal transmission system which can satisfactorily transmit digital audio data using a transmitting line for transmitting video data, while utilizing the existing configuration for transmitting video data as it is.

BEST MODE FOR CARRYING OUT THE INVENTION

Hereinafter, an embodiment of the present invention will be described with reference to the drawings.

A digital signal transmitting/receiving system according to this embodiment transmits video data and audio data which are outputted from a video/audio signal source such as a videotape recorder/player, a video disc player or a tuner, to a display device such as a monitor receiver or a television receiver having an audio output function as a display device, using one transmission cable. A cable that allows data to be transmitted based on a standard referred to as DVI (Digital Visual Interface) is employed as this transmission cable.

Figure 1:
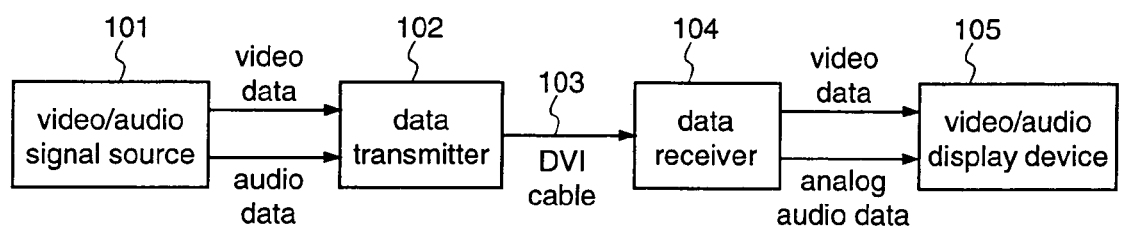
FIG. 1 is a block diagram illustrating an entire configuration of a digital signal transmission system according to an embodiment of the present invention.

FIG. 1 is a diagram showing an entire configuration of the digital signal transmission system according to this embodiment. In this figure, reference numeral 101 denotes a video/audio signal source such as a videotape recorder/player, a video disc player, or a tuner. Numeral 102 denotes a data transmitter that superimposes audio data upon video data that are outputted from the video/audio signal source to be transmitted to a DVI cable. Numeral 103 denotes a DVI cable. Numeral 104 denotes a data receiver that receives a superimposed video/audio data signal that is transmitted through the DVI cable 103, and outputs video data and an analog audio signal. Numeral 105 denotes a video/audio display device that receives the video data and the analog audio signal from the data receiver, and displays video and outputs sounds. Connector portions of the data transmitter 102 and the data receiver 104, to which the DVI cable 103 is connected, are constructed for example of a 24-pin connector. The 24 pins of the connector of the data transmitter 102 and the 24 pins of the connector of the data receiver 104 are individually connected by the cable 103.

Figure 2:
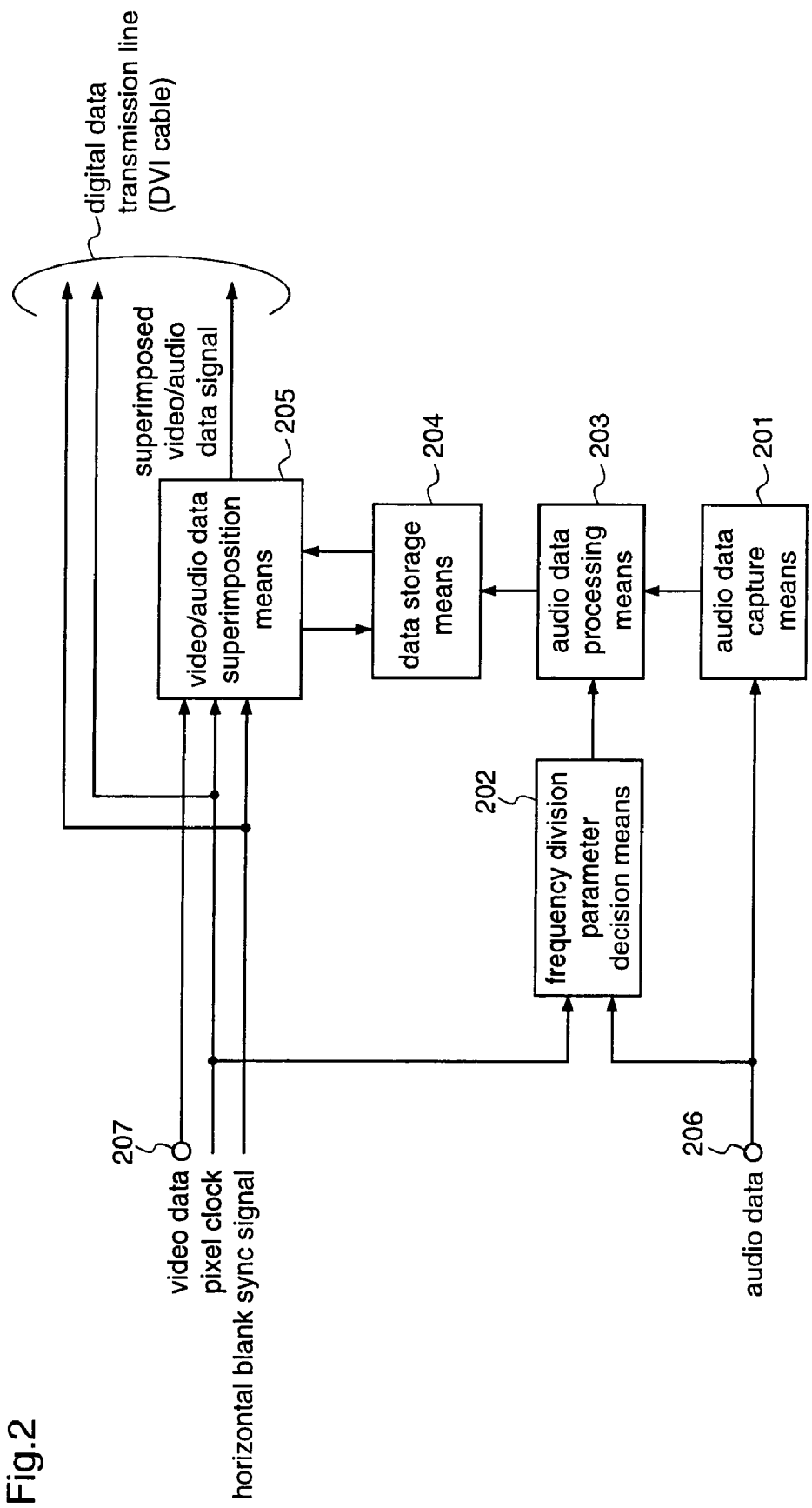
FIG. 2 is a block diagram illustrating a configuration of a data transmitter in the digital signal transmission system according to the embodiment of the present invention.

FIG. 2 is a block diagram illustrating a configuration of the data transmitter shown in FIG. 1. In this figure, reference numeral 201 denotes an audio data capture means that captures digital audio data that are outputted from the video/audio signal source. Numeral 202 denotes a frequency division parameter decision means that decides a frequency division parameter on the basis of a pixel clock of video which is outputted from the video/audio signal source and a sampling frequency of audio data. Numeral 203 denotes an audio data processing means that performs processing like addition of information such as the frequency division parameter that is decided by the frequency division parameter decision means 202, to the digital audio data that are captured by the audio data capture means 201, thereby to generate transmission audio data. Numeral 204 denotes a data storage means that temporarily stores the transmission audio data that are generated by the audio data processing means. Numeral 205 denotes a video/audio data superimposition means that generates a timing signal using a horizontal blank sync signal and the pixel clock of video outputted from the video/audio signal source, and superimposes the transmission audio data that are stored in the data storage means 204 at a predetermined position in a horizontal blanking interval of video data that are outputted from the video/audio signal source in accordance with the generated timing signal, thereby to generate a superimposed video/audio data signal. Numeral 206 denotes an audio data input terminal, and numeral 207 denotes a video data input terminal.

Figure 3:
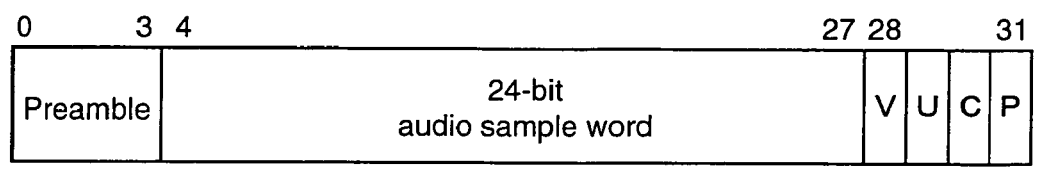
FIG. 3 is a diagram illustrating an example of a configuration of digital audio data.

Digital audio data that are inputted from an audio processing unit (not shown) in the video/audio signal source to the audio data input terminal 206 are captured by the audio data capture means 201. In this embodiment, the audio data that are inputted to the audio data input terminal 206 are audio data that are packetized according to IEC (International Electrotechnical Commission) 60958 system. As shown in FIG. 3, one packet (one subframe) of IEC 60958 packet data is composed of 32 bits. A preamble of 4 bits is located at the head, and one sample of audio data (audio sample word) is located at a section of the following 24 bits. In some cases, one sample data that are composed of less than 24 bits (for example, 16 bits) may be located. Further, sub-codes (VUCP) are located at the last four bits.

The frequency division parameter decision means 202 decides a frequency division parameter on the basis of the pixel clock of video that is outputted from the video/audio signal source and the sampling frequency of audio data. An audio clock is needed when digital audio data are reproduced as an analog audio signal on the receiving end and accordingly, as will be described later, the digital signal transmission system according to this embodiment divides the frequency of the pixel clock that is transmitted from the transmitting end, thereby to generate an audio clock, and employs the generated audio clock for the reproduction of audio data on the receiving end. Since the audio clock is generated on the basis of the pixel clock, jitter or the like is likely to occur and the audio clock precision may be decreased. However, to prevent occurrence of jitter and generate the audio clock with precision, the digital signal transmission system according to this embodiment transmits the frequency division parameter that is decided on the basis of the pixel clock of video and the sampling frequency of audio data, to the receiving end, and divides the frequency of the pixel clock that is transmitted from the transmitting end, using the frequency division parameter, thereby to generate the audio clock on the receiving end. As described above, the frequency division parameter is uniquely decided on the basis of the pixel clock of video and the sampling frequency of audio data. It is assumed here that the audio clock is obtained by multiplying the sampling frequency of the audio data by 128, and a frequency division parameter N is set at a value by which the pixel clock is multiplied to obtain the least common multiple of the audio clock and the pixel clock. For example, when image data has the 480P image quality, the pixel clock is 27.000 MHz, while the frequency division parameter N is 6144 when the sampling frequency of audio data is 48 kHz, and the frequency division parameter N is 6272 when the sampling frequency of audio data is 44.1 kHz. When image data has the 1080I image quality, the pixel clock is 74.176 MHz, while the frequency division parameter N is 11648 when the sampling frequency of the audio data is 48 kHz, and the frequency division parameter N is 17836 when the sampling frequency of the audio data is 44.1 kHz. The frequency division parameter decision means 202 holds values of the frequency division parameter as a table, and reads a corresponding frequency division parameter on the basis of the frequency of the pixel clock that is supplied from the video/audio signal source and the sampling frequency that is described in the preamble of the audio data, thereby to output the value to the audio data processing means 203.

The digital audio data that are captured by the audio data capture means 201 are outputted to the audio data processing means 203. The audio data processing means 203 adds a header including information such as the frequency division parameter that is decided by the frequency division parameter decision means 202 or the length of processed data, to the digital audio data that are received from the audio data capture means 201, and further performs processing of converting the audio data into a format that is suitable for data transmission, such as conversion of data into multi-bit data, thereby to generate transmission audio data. The transmission audio data that are generated by the audio data processing means 203 are temporarily stored in the data storage means 204, and inputted to the video/audio data superimposition means 205 in accordance with a load signal that is synchronized with an audio data superimposition timing which is outputted from the video/audio data superimposition means.

Video data that are coded based on the DVI standard are supplied from a video processing unit (not shown) in the video/audio signal source to the video data input terminal 207. The video data that are supplied to the video data input terminal 207 are inputted to the video/audio data superimposition means 205. The video/audio data superimposition means 205 performs a composition process for multiplexing audio data with video data, and transmits composite data to the DVI cable.

Figure 4:
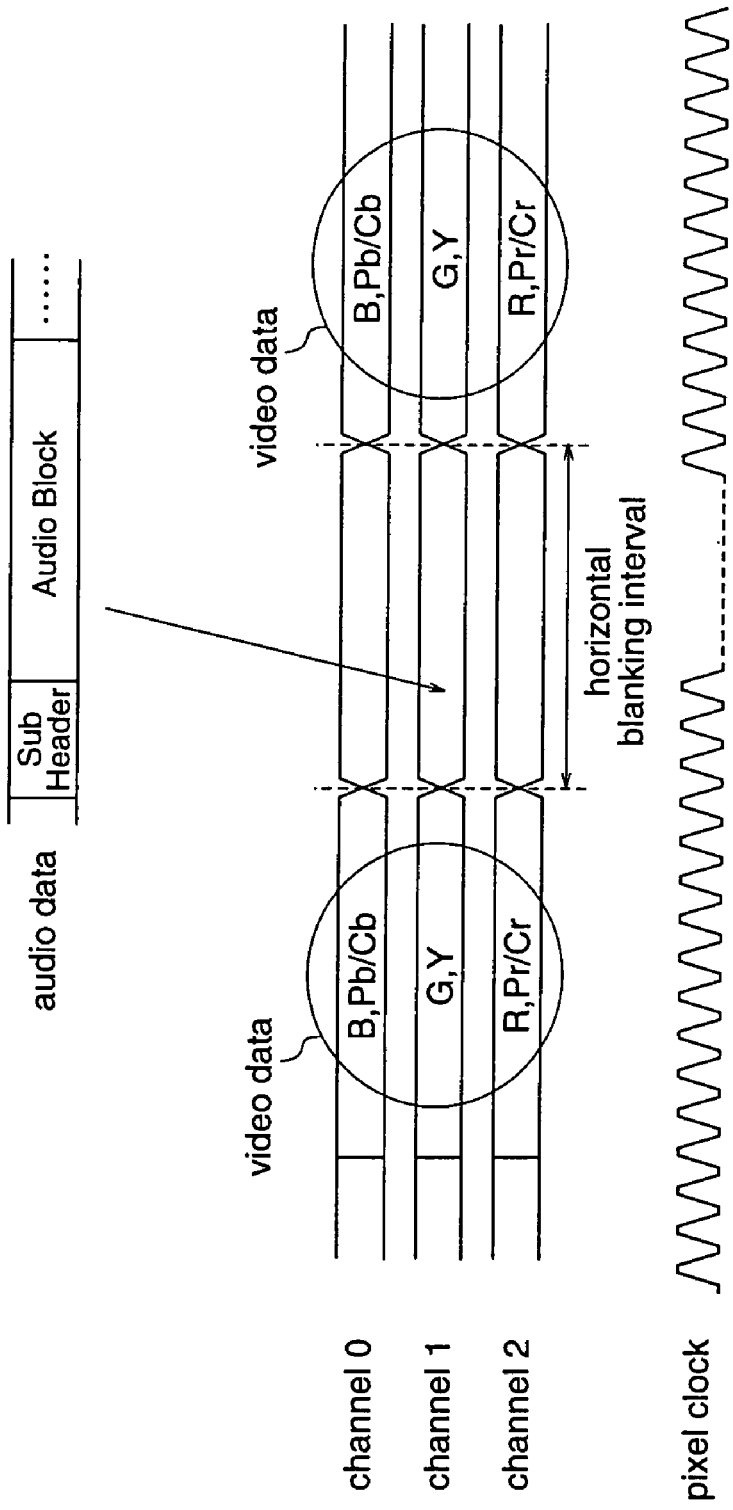
FIG. 4 is a diagram for explaining an operation for superimposing audio data upon video data that are transmitted in a DVI format.

Here, a configuration of video data that are transmitted in the DVI format will be described with reference to FIG. 4. When video data are transmitted, B data (blue data) shown by channel 0 in FIG. 4, G data (green data) shown by channel 1 in FIG. 4, R data (red data) shown by channel 2 in FIG. 4 are transmitted as data of the individual channels, respectively. One pixel is composed of 8-bit data in each channel, and three channels correspond to 24-bit data per pixel in total. However, when pixel data are actually transmitted in the DVI format, 8-bit data are transformed into 10-bit data. Pixel data of the respective channels are transmitted in synchronization with the pixel clock.

According to the DVI format, pixel data of each channel are not transmitted during a horizontal blanking interval and a vertical blanking interval, but data that are defined as a horizontal sync signal HSYNC, data that are defined as a vertical sync signal VSYNC, or various kinds of control data are transmitted during these intervals. The digital signal transmission system of this embodiment superimposes the transmission audio data over a horizontal blanking interval of any of the channels. FIG. 4 shows an example in which audio data are located in the horizontal blanking interval of the G data transmission channel that is shown by channel 1.

The video/audio data superimposition means 205 generates a superimposition timing signal for audio data using a horizontal blank sync signal and a pixel clock that are supplied from the video/audio signal source. More specifically, the video/audio data superimposition means 205 outputs a load signal to the data storage means 204 at a time when the count of the pixel clocks starting from the receipt of the horizontal blank sync signal reaches a predetermined number (n). The transmission audio data that are temporarily stored in the data storage means 204 are inputted from the data storage means 204 to the video/audio superimposition means 205 in accordance with the load signal that is outputted from the video/audio data superimposition means, and superimposed at a predetermined position in the horizontal blanking interval of video data.

For example, when the horizontal frequency of video data is 15.75 kHz and the sampling frequency of audio data is 48 kHz, one horizontal scanning period of the video data is about 63.5 µsec, and one sampling period of the audio data is about 20.8 µsec. Therefore, by combining two processes in such a manner that a process for transmitting four frames of audio data in one horizontal line is carried out once each time a process for transmitting three frames of audio data in one horizontal line is carried out at tens of times, the data can be transmitted without occurring delay of audio with relative to video.

As described above, the data transmitter according to this embodiment transmits a superimposed video/audio data signal in which audio data are superimposed at a predetermined position in the horizontal blanking interval of video data, to the data receiver through the DVI cable, together with the horizontal blank sync signal or the pixel clock.

Figure 5:
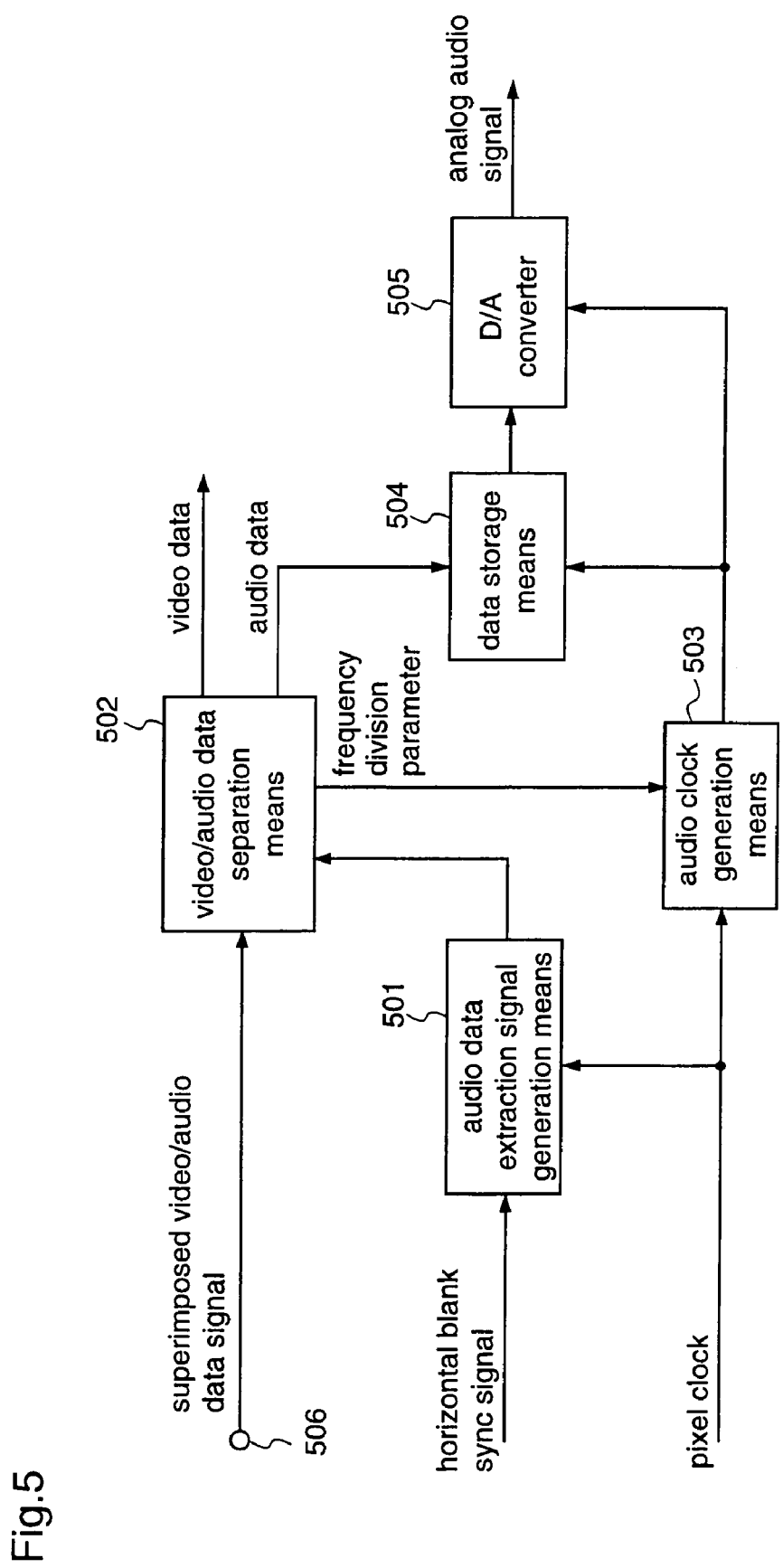
FIG. 5 is a block diagram illustrating a configuration of a data receiver in the digital signal transmission system according to the embodiment of the present invention.

FIG. 5 is a block diagram illustrating a configuration of the data receiver in FIG. 1. In this figure, reference numeral 501 denotes an audio data extraction signal generation means that generates an audio data extraction signal which is a timing signal for extracting audio data from a superimposed video/audio data signal, using a horizontal blank sync signal and a pixel clock which are transmitted from the data transmitter through the DVI cable. Numeral 502 denotes a video/audio data separation means that separates superimposed video/audio data signal into video data and audio data on the basis of the audio data extraction signal that is outputted from the audio data extraction signal generation means 501 and information indicating the length of audio data, which is added to the audio data. Numeral 503 denotes an audio clock generation means that divides the frequency of the pixel clock that is transmitted from the data transmitter through the DVI cable on the basis of the frequency division parameter which is added to the audio data, thereby to generate an audio clock. Numeral 504 denotes a data storage means that stores the audio data that are separately outputted from the video/audio data separation means 502, and outputs the stored audio data in accordance with the audio clock that is outputted from the audio clock generation means 503. Numeral 505 denotes a D/A converter that successively converts the digital audio data that are outputted from the data storage means 504 into an analog audio signal in accordance with the audio clock that is outputted from the audio clock generation means 503. Numeral 506 denotes an input terminal for the superimposed video/audio data signal.

The superimposed video/audio data signal that is generated by the video/audio data superimposition means 205 in the data transmitter and transmitted through the DVI cable is supplied to the input terminal 506 for the superimposed video/audio data signal. This superimposed video/audio data signal is inputted to the video/audio data separation means 502.

Further, the horizontal blank sync signal and the pixel clock which are transmitted from the data transmitter through the DVI cable are inputted to the audio data extraction signal generation means 501. The audio data extraction signal generation means 501 outputs the audio data extraction signal at a time when the count of the pixel clocks starting from the receipt of the horizontal blank sync signal reaches a predetermined number (n).

The audio data extraction signal that is generated by the audio data extraction signal generation means 501 is supplied to the video/audio data separation means 502. The video/audio data separation means 502 separates, from the superimposed video/audio data signal, data corresponding to the audio data length that is described in the header of the audio data from receipt of the audio data extraction signal, thereby extracting audio data that are located at a predetermined position in a horizontal blanking interval of video data. The separated audio data are temporarily stored in the data storage means 504.

The audio clock generation means 503 divides the frequency of the pixel clock that is transmitted from the data transmitter through the DVI cable on the basis of the frequency division parameter that is transmitted with being added to the audio data and separated by the video/audio data separation means 502, thereby to generate an audio clock having a frequency that is 128 times as high as the audio sampling frequency. Then, the audio clock generation means 503 further performs the frequency division on the basis of the generated clock to generate a L/R clock (This is a sampling clock for audio. Generally, Lch data are transmitted in high sections while Rch data are transmitted in low sections.) and a bit clock (This is a clock that is synchronized with the L/R clock and employed to decide audio data. This clock is employed when the data are to be transmitted serially. Generally, it is a clock having a frequency that is 64 times or 32 times as high as the sampling frequency. One bit data is decided for one clock).

The data storage means 504 outputs the stored audio data to the D/A converter 505 in accordance with the audio clock that is outputted from the audio clock generation means 503. The D/A converter 505 receives the digital audio data that are synchronized with the bit clock, from the data storage means 504, and converts the digital audio data into an analog audio signal using three kinds of clock signals which are generated by the audio clock generation means 503.

As described above, according to this embodiment, a superimposed video/audio data signal in which audio data are superimposed over a horizontal blanking interval of video data in a superimposition timing that is generated using a horizontal blank sync signal and a pixel clock, is transmitted from a data transmitting end to a data receiving end through a DVI cable, together with the horizontal blank sync signal and the pixel clock. On the data receiving end, a timing signal for extracting audio data from a superimposed video/audio data signal is generated using the transmitted horizontal blank sync signal and pixel clock, and the superimposed video/audio data signal is separated into video data and audio data using the generated timing signal, as well as digital audio data are converted into an analog audio signal using an audio clock that is generated by dividing the frequency of the pixel clock. Therefore, audio data can be transmitted easily and satisfactorily through an existing interface for transmitting video data. In other words, audio data can be transmitted through the same signal cable as that for video data, using an existing system that transmits digital video data, which is standardized as the DVI standard. Particularly in this embodiment, the transmission process for video data is carried out in the existing manner, while the timing signal is generated using the horizontal blank sync signal and the pixel clock, and the superimposition and separation of audio data is performed using the generated timing signal. Therefore, there is no need to change the conventional configuration of the mechanism for transmitting video data based on the DVI standard, and the processing blocks for video data that are prepared for the DVI standard can be employed as they are both on the transmitting and receiving ends.

Figure 6:
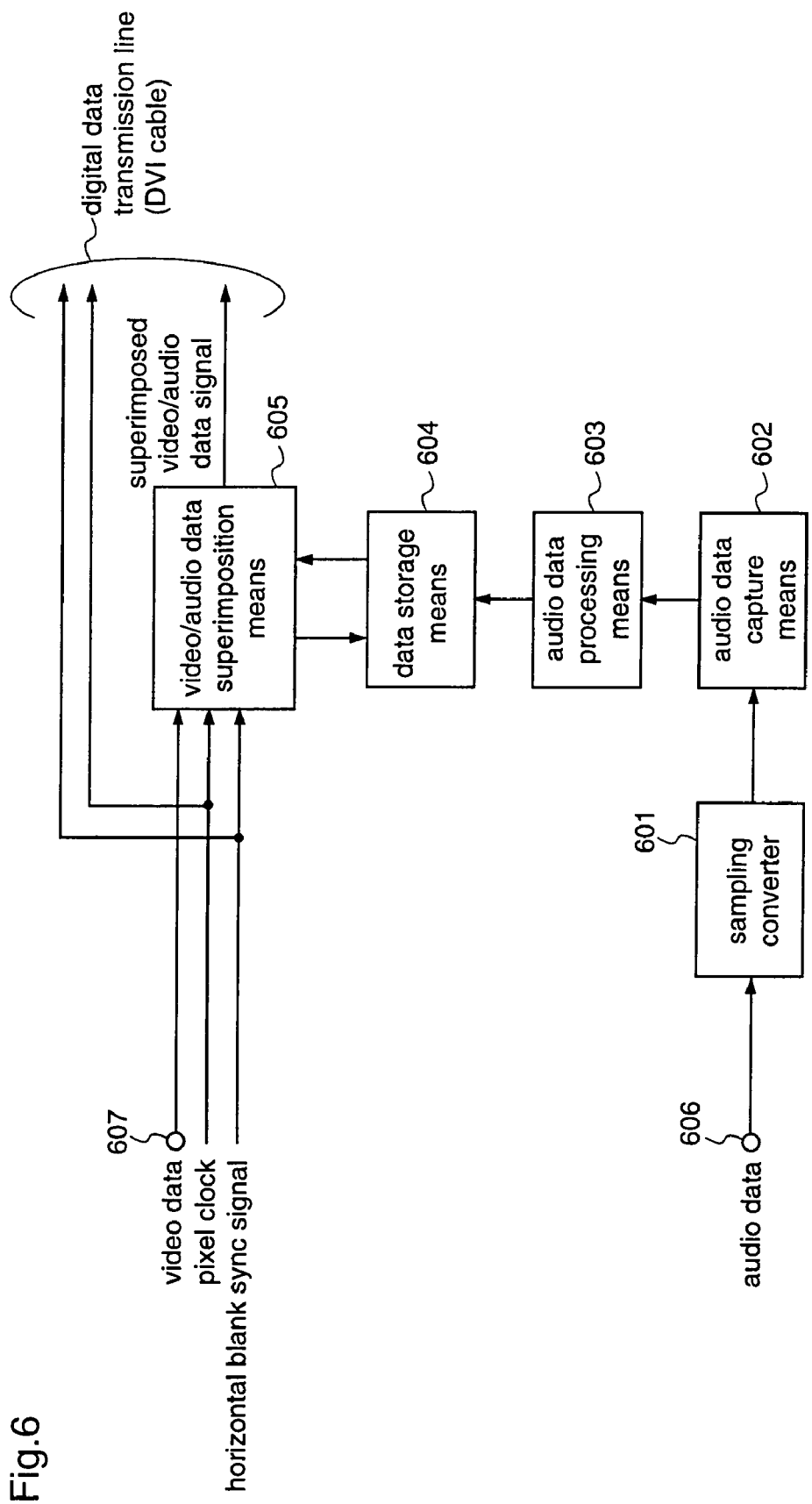
FIG. 6 is a block diagram illustrating a configuration of a variation of the data transmitter in the digital signal transmission system according to the embodiment of the present invention.
Figure 7:
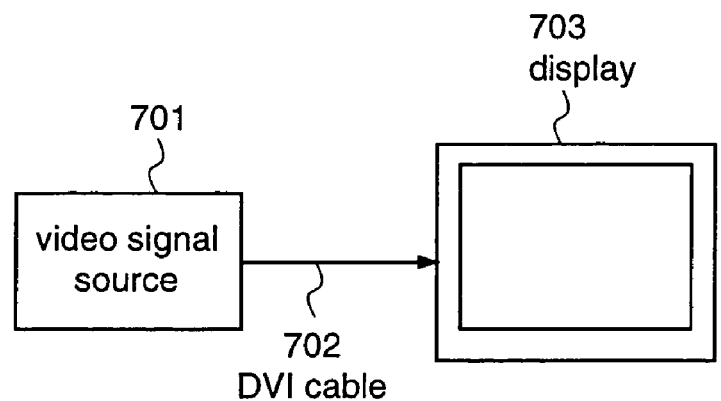
FIG. 7 is a block diagram illustrating an example of an entire configuration of a conventional digital signal transmission system that transmits only video data.
Figure 8:
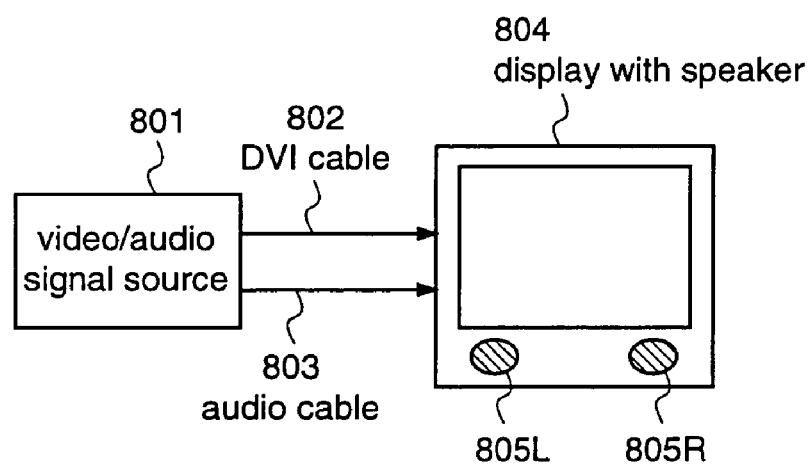
FIG. 8 is a diagram for explaining prior art problems.

A variation of the data transmitter according to this embodiment will be described. FIG. 6 is a diagram illustrating a configuration of the variation of the data transmitter according to the embodiment. In this figure, reference numeral 601 denotes a sampling converter that keeps constant the sampling frequency of digital audio data supplied from the video/audio signal source. Numeral 602 denotes an audio data capture means that capture digital audio data after the sampling frequency is converted by the sampling converter 601. Numeral 603 denotes an audio data processing means that carries out processing like addition of information to audio data that are captured by the audio data capture means 602, thereby to generate transmission audio data. Numeral 604 denotes a data storage means which temporarily stores the transmission audio data that are generated by the audio data processing means. Numeral 605 denotes a video/audio data superimposition means that generates a timing signal, using a horizontal blank sync signal and a pixel clock of video which are outputted from the video/audio signal source, and superimposes the transmission audio data that are stored in the data storage means 604 at a predetermined position in a horizontal blanking interval of video data that are outputted from the video/audio signal source, using the generated timing signal, thereby to generate a superimposed video/audio data signal. Numeral 606 denotes an input terminal for audio data, and numeral 607 denotes an input terminal for video data.

The sampling frequency for audio data takes various values. For example, the sampling frequency for audio data in the case of CD is 44.1 kHz while it is 46 kHz in the case of DVD. Thus, the frequency division ratio of a PLL that creates an audio reference clock from the pixel clock on the receiving end takes various values, so that the PLL configuration is adversely complicated. The variation shown in FIG. 6 comprises the sampling converter that keeps constant the sampling frequency for audio data that are superimposed upon video data, so as to simplify the circuit configuration on the receiving end.

The frequency division ratio between the pixel clock and the audio clock in the case where the sampling frequency for audio is 48 kHz have values that are divisible without a remainder in all cases where the video data are 480I, 480P, 1080I and the like, whereby the configuration of the audio clock generation means in the receiver can be simplified.

Next, the typical operation of the sampling converter will be described. For example, in order to convert 44.1 kHz sampling audio data into 48 kHz audio sampling data, the 44.1 kHz sampling audio data are subjected to filtering with a band of 24 kHz, and interpolation between 44.1 kHz and 48 kHz is performed to convert the data into 48 kHz sampling data.

Operations after the sampling frequency conversion are the same as those of the data transmitter as shown in FIG. 2, and thus the description of these operations are not given here.

In this case, the configuration for deciding the frequency division parameter and adding the decided parameter to audio data is not shown in the variation as shown in FIG. 6. However, since the sampling frequency of audio data to be superimposed is kept constant, the frequency division ratio for generating an audio clock is always fixed when the image quality of video data supplied from the video/audio signal source is fixed, whereby there is no need of the configuration for transmitting the frequency division parameter to the receiving end. On the other hand, when the image quality of video data from the video/audio signal source varies (for example, 480P or 1080I), it is effective to provide a configuration for deciding the frequency division parameter and add the decided parameter to audio data, like in the data transmitter shown in FIG. 2, for accurately generating audio data on the receiving end.

Further, in the above-mentioned embodiment, the frequency of the audio clock is obtained by multiplying the sampling frequency of audio data by 128, then the frequency division parameter N is set at a value by which the pixel clock is multiplied to obtain the minimum common multiple of the audio clock and the pixel clock, and the obtained frequency division parameter N is added to the audio data to be transmitted. However, in addition to the frequency division parameter N, a value of M that meets a following relationship:

$$M = \text{pixel clock} \times N / \text{audio clock}$$

may be simultaneously transmitted as information which is added to the audio data. Accordingly, it is possible that the audio clock on the receiving end and the audio clock on the transmitting end are made be in phase with each other.

In the above-mentioned embodiment, the timing signal is generated using the horizontal blank sync signal and the pixel clock, and audio data are superimposed at a predetermined position in a horizontal blanking interval of video data, using the generated timing signal. However, a timing signal may be generated using a vertical blank sync signal and the pixel clock, and audio data may be superimposed at a predetermined position in a vertical blanking interval of video data, using the generated timing signal.

In this embodiment, the description has been given of a case where two channels of digital audio data are transmitted, while this invention is also applicable to cases where one channel of digital audio data are transmitted, or three or more channels of digital audio data are transmitted.

In the above-mentioned embodiment, packets that contain digital audio data at a predetermined sampling rate are transmitted, while digital audio data that are compressively coded according to a predetermined method (for example, AC3 method or AAC method) may be included in packets.

Further, in the above-mentioned embodiment, audio data are multiplexed into video data and transmitted using a DVI standard transmission line. However, other video data transmission standard may be adopted. In such case, a transmission line which enables radio transmission may be employed in addition to a transmission line that is connected by a wired cable.

INDUSTRIAL AVAILABILITY

This invention provides a data transmission method and a data receiving method, which can transmit audio data easily and satisfactorily using an existing interface that allows transmission of video data in a digital signal transmission system in which a video signal source and a video display device are connected for example through a DVI (Digital Video Interface).

The invention claimed is:

1. A data transmission method in a digital signal transmission system using a digital display connecting interface, comprising:
   capturing digital audio data from a video/audio signal source;
   processing the captured digital audio data to generate transmission audio data;
   generating a timing signal using a vertical blanking sync signal and a pixel clock for video data, which are obtained from the video/audio signal source, and superimposing the transmission audio data at a predetermined position in a vertical blanking interval of video data that are outputted from the video/audio signal source, in accordance with the generated timing signal; and
   transmitting the video data on which the transmission audio data are superimposed, the vertical blanking sync signal, and the pixel clock, to a data receiving end,
   the transmission audio data including a frequency division parameter at a time when an audio clock that is used in reproduction of digital audio data is generated by dividing the frequency of the pixel clock for video data.

2. The data transmission method of claim 1, wherein
   the frequency division parameter has two values N and M that meet a following relationship:
   the pixel clock×N=the audio clock×M.

3. The data transmission method of claim 2, further comprising
   prior to generating the transmission audio data, converting a sampling frequency for the digital audio data that are captured from the video/audio signal source.

4. The data transmission method of claim 1, further comprising
   prior to generating the transmission audio data, converting a sampling frequency for the digital audio data that are captured from the video/audio signal source.

5. A data receiving method in a digital signal transmission system using a digital display connecting interface, comprising:
   receiving video data on which transmission audio data are superimposed at a predetermined position in a vertical blanking interval, a vertical blanking sync signal, and a pixel clock for video data;
   generating a timing signal using the vertical blanking sync signal and the pixel clock which are transmitted from a transmitting end, and separating the video data on which the transmission audio data transmitted are superimposed, into video data and audio data, using the generated timing signal; and
   dividing the frequency of the pixel clock using a frequency division parameter included in the transmission audio data, thereby generating an audio clock that is used in reproduction of digital audio data.

6. The data receiving method of claim 5, wherein
   the frequency division parameter has two values N and M that meet a following relationship:
   the pixel clock×N=the audio clock×M.

7. A data transmitter that is employed in a digital signal transmission system using a digital display connecting interface, comprising:
   a data capture means for capturing digital audio data from a video/audio signal source;
   an audio data processing means for processing the digital audio data that are captured by the data capture means, to generate transmission audio data;
   a video/audio data superimposition means for generating a timing signal using a vertical blanking sync signal and a pixel clock for video data, which are obtained from the video/audio signal source, and superimposing the transmission audio data at a predetermined position in a vertical blanking interval of video data that are outputted from the video/audio signal source, in accordance with the generated timing signal; and
   a data transmission means for transmitting the video data on which the transmission audio data are superimposed, the vertical blanking sync signal, and the pixel clock, to a data receiving end,
   the transmission audio data including a frequency division parameter at a time when an audio clock that is used in reproduction of digital audio data is generated by dividing the frequency of the pixel clock for video data.

8. A data receiver in a digital signal transmission system using a digital display connecting interface, comprising:
   a receiving means for receiving video data on which transmission audio data are superimposed at a predetermined position in a vertical blanking interval, a vertical blanking sync signal, and a pixel clock for video data;
   a video/audio data separation means for generating a timing signal using the vertical blanking sync signal and the pixel clock, and separating the video data on which the audio data that are transmitted from a data transmitter are superimposed, into video data and audio data, using the generated timing signal; and
   an audio clock generation means for dividing the frequency of the pixel clock using a frequency division parameter included in the transmission audio data, thereby generating an audio clock that is used in reproduction of digital audio data.

9. A digital signal transmission system for transmitting a digital signal from a data transmitter to a data receiver using a digital display connecting interface, wherein
   said data transmitter comprises:
   a data capture means for capturing digital audio data from a video/audio signal source;
   an audio data processing means for processing the digital audio data that are captured by the data capturing means to generate transmission audio data;
   a video/audio data superimposition means for generating a timing signal using a vertical blanking sync signal and a pixel clock for video data, which are obtained from the video/audio signal source, and superimposing the transmission audio data at a predetermined position in a vertical blanking interval of video data that are outputted from the video/audio signal source, using the generated timing signal; and a data transmission means for transmitting the video data on which the transmission audio data are superimposed, the vertical blanking sync signal, and the pixel clock, to a data receiving end, and the transmission audio data includes a frequency division parameter at a time when an audio clock that is used in reproduction of digital audio data is generating by dividing a frequency of the pixel clock for video data, and said data receiver comprises:

a receiving means for receiving the video data on which the transmission audio data are superimposed at the predetermined position in the vertical blanking interval, the vertical blanking sync signal, and the pixel clock for video data;

a video/audio data separation means for generating a timing signal using the vertical blanking sync signal and the pixel clock, and separating the video data transmitted from said data transmitter, on which the transmission audio data are superimposed, into video data and audio data, using the generated timing signal; and an audio clock generation means for dividing the frequency of the pixel clock using the frequency division parameter included in the transmission audio data, thereby generating the audio clock that is used in reproduction of digital audio data.

10. A data transmitting/receiving method of a digital transmission system for transmitting a digital signal from a data transmitter to a data receiver using a digital display connecting interface, wherein a data transmitting method of the data transmitter comprises:

capturing digital audio data from a video/audio signal source;

processing the captured digital audio data to generate transmission audio data;

generating a timing signal using a vertical blanking sync signal and a pixel clock for video data, which are obtained from the video/audio signal source, and superimposing the transmission audio data at a predetermined position in a vertical blanking interval of video data that are outputted from the video/audio signal source, using the generated timing signal; and transmitting the video data on which the transmission audio data are superimposed, the vertical blanking sync signal, and the pixel clock, to a data receiving end, and the transmission audio data includes a frequency division parameter at a time when an audio clock that is used in reproduction of digital audio data is generating by dividing a frequency of the pixel clock for video data, and a data receiving method of the data receiver comprises:

receiving the video data on which the transmission audio data are superimposed at the predetermined position in the vertical blanking interval, the vertical blanking sync signal, and the pixel clock for video data;

generating a timing signal using the vertical blanking sync signal and the pixel clock, and separating the video data on which the transmission audio data are superimposed, into video data and audio data, using the generated timing signal; and dividing the frequency of the pixel clock using the frequency division parameter included in the transmission audio data, thereby generating the audio clock that is used in reproduction of digital audio data.

* * * * *